April 3, 1928.
S. MUMOVICH
1,664,786
DUST COLLECTING DEVICE FOR ROCK DRILLS
Filed July 26, 1926
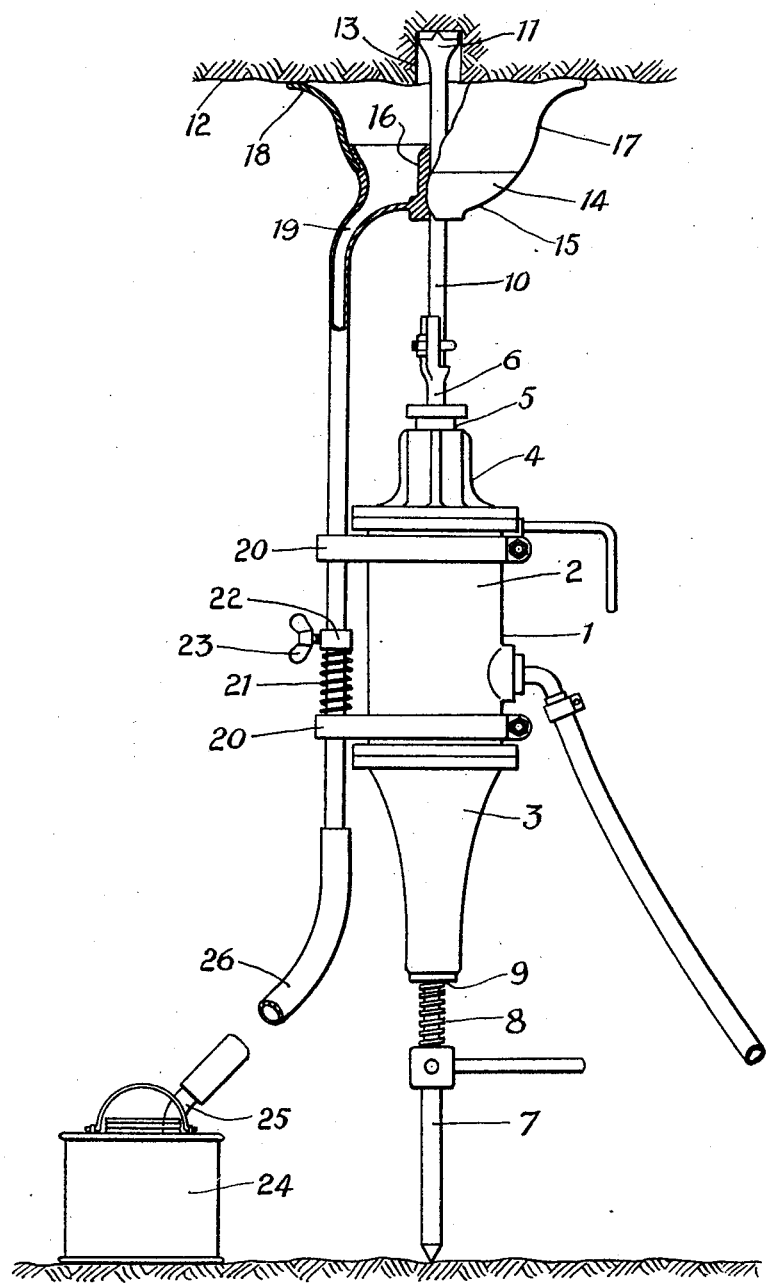
INVENTOR
SPIRO MUMOVICH
BY Fetherstonhaugh & Co
ATTORNEYS Patented Apr. 3, 1928.

1,664,786

UNITED STATES PATENT OFFICE.

SPIRO MUMOVICH, OF ANYOX, BRITISH COLUMBIA, CANADA.

DUST-COLLECTING DEVICE FOR ROCK DRILLS.

Application filed July 26, 1926. Serial No. 125,090.

My invention relates to improvements in dust collecting devices for rock drills, which devices are adapted for use particularly in subterranean workings where artificial ventilation is resorted to and the draught prevailing carries the dust, from the drilling, in suspension, seriously endangering the lives of the workers therein, through its entering their respiratory organs by inhalation. The objects of the invention are to provide means whereby the cuttings and dust from the drilling are confined within the hole drilled and a small area therearound and are conducted from thence to a suitable receptacle, from which it can be removed as and where desired, so that the air available for respiration in the workings is unimpaired.

The invention consists essentially of a flexible cup adapted to surround the drill rod on a drilling machine of rotary, reciprocating or any other type, and is held in intimate contact with the surface surrounding the hole drilled and means for conveying the dust or cuttings discharged from the hole into the cup, into a suitable receptacle, as will be more fully described in the following specification, in which:—

The drawing is a general view, part in section, of the device attached to a rotary type drilling machine.

The numeral 1 indicates generally a rock drilling machine of the rotary type having a cylinder body 2, a support head 3 and a front head 4 having the usual stuffing box 5 through which a shaft 6 is rotatably movable.

The numeral 7 indicates an extension leg threaded at its upper end as at 8, the threaded portion being fitted into a correspondingly threaded aperture 9 in the support head 3, so that by rotating the leg 7 to unscrew it from the head 3 the drilling machine and its drill is advanced up to its work. Connected to the shaft 6 is a drill rod 10 having a cutting bit 11 at its upper extremity by which the drilling is effected. The numeral 12 indicates the surface of the working, shown in section in the drawing, in which a hole 13 is being drilled. Mounted upon the drill rod 10 is a cup 14 preferably having a metallic base 15 provided with an axial sleeve 16 through which the drill rod 10 is adapted to extend, the upper portion of the cup indicated by the numeral 17 is preferably of rubber or other flexible material and is provided with a flared lip 18 which is adapted to lie in intimate contact with the surface of the working 12. Extending from the cup 14 adjacent its base is a rigid tube 19 which extends downwards past the cylinder 2 in parallel relation thereto and is slidably supported therefrom by a pair of straps 20. Mounted upon the tube 19 and in bearing contact with one of the straps 20 is a coil spring 21, the upper end of which is adjustably engaged by a collar 22, which collar is adapted to be secured to the tube by a wing bolt 23 so that sufficient compression may be provided in the spring to raise the tube 19 and hold the cup 14 into such firm engagement with the surface of the working that no dust falling from the hole 13 may escape around the flared lip 18 of the rubber portion 17 of the cup. An alternate means of supporting the cup in contact with the working would be to provide the tube with a substantially tight fitting collar of rubber or other suitable material which would bear against one of the straps 20.

The numeral 24 indicates a container or other suitable receptacle having a nozzle 25 between which and the tube 19 a hose 26 is connected for the purpose of conveying the dust from the cup into the container. When it is desired to use the device on a reciprocatory and rotatory drilling machine having a blower tube extending axially through the piston and fitted with axially bored drill rods and bit, air would be caused to flow through the machine and its drill bit, so as to provide force to eject the dust. In such an installation a bag of closely woven textile fabric would be used to receive the dust and to permit the escape of the air therefrom through the weave of the material.

Having thus described the several parts of my invention I will now briefly explain its use.

The drill equipped with the dust collecting device adapted for gravity discharge may be effectively used in any position from a slight upward incline from the horizontal to a vertical position, and if equipped for blower discharge it may be effectively used when drilling on a downward incline. The wing bolt 23 is slackened off to free the collar 22 from the tube 19, which tube is lowered to fully expose the bit 11, the drilling machine is placed in position with the bit against the surface 12 of the working and the leg 7 is unscrewed to engage upon a suitable bearing to hold the bit in cutting contact with its work. The tube 19 is then raised until the cup 14 is in firm engagement with the surface of the working, when the spring 21 is compressed and so held by the tightening of the collar 22 to the tube. The tightening above referred to may be such as to hold the spring compressed only, but to allow the tube to slide therethrough when sufficient force is applied. As the hole is extended by the cutting action of the bit 11 the leg 7 is unscrewed to advance the drill to its work, which action also serves to maintain a proper contact between the lip of the cup 14 and the surface of the working.

It will thus be seen that I have invented a device by which cuttings and dust may be confined and collected in such a manner that the ventilation in the workings is unimpaired and that healthier working conditions would prevail therein than is possible without its use.

What I claim as my invention is:

1. The combination with a rock drilling machine including a cylinder and a drill rod of bearing members carried by and projecting laterally from said cylinder, a rigid dust conveying tube slidably mounted in said bearing members, an abutment carried by said tube, a spring confined between said abutment and one of the bearing members and tending to move the tube in the direction of the work, and a dust collecting cup carried by said tube and receiving the drill rod therethrough, the interior of said cup being in communication with the interior of said tube.

2. The combination with a rock drilling machine including a cylinder and a drill rod of bearings carried by and projecting laterally from the cylinder, a rigid dust conveying tube slidably mounted in said bearings and formed at one end with an integral laterally offset cup having a central opening receiving the drill rod therethrough, a flexible lip carried by said cup, and a spring encircling said tube and confined in compression between an abutment on the tube and one of said bearings so as to normally tend to slide the tube in the direction of the work to maintain contact between the work and the flexible lip of the cup.

Dated at Anyox, B. C., Canada, this 10th of July, A. D. 1926.

SPIRO MUMOVICH.